(12) United States Patent
Brennan

(10) Patent No.: US 8,348,276 B2
(45) Date of Patent: Jan. 8, 2013

(54) DETECTING CONTACTS DURING SPORTING ACTIVITIES ETC

(75) Inventor: Warren Brennan, Hawthorn (AU)

(73) Assignee: Brennan Broadcast Group Pty Ltd, Hawthorn, Victoria (AU)

( * ) Notice: Subject to any disclaimer, the term of this patent is extended or adjusted under 35 U.S.C. 154(b) by 1074 days.

(21) Appl. No.: 12/281,202

(22) PCT Filed: Mar. 1, 2007

(86) PCT No.: PCT/AU2007/000234
§ 371 (c)(1),
(2), (4) Date: Aug. 29, 2008

(87) PCT Pub. No.: WO2007/098537
PCT Pub. Date: Sep. 7, 2007

(65) Prior Publication Data
US 2009/0017919 A1     Jan. 15, 2009

(30) Foreign Application Priority Data

Mar. 1, 2006 (AU) .............................. 2006100154
Nov. 22, 2006 (AU) .............................. 2006906528

(51) Int. Cl.
*A63F 13/12* (2006.01)

(52) U.S. Cl. .............. 273/118 R; 463/3; 463/5; 463/34; 463/53; 273/317.4; 273/317.6; 273/108.3; 273/108.4; 377/5; 473/451; 473/468; 473/499

(58) Field of Classification Search ............ 463/1–9, 463/20, 23, 25, 30–32, 34, 36–37, 40–43, 463/46–47, 50, 53, 56; 273/108.1, 108.3, 273/108.4, 118 R, 150, 244, 244.1, 247, 259, 273/317.1, 317.3, 317.4, 317.5, 317.6, 359, 273/406, 440.1, 460–461; 340/323 R, 323 B; 377/4–5; 446/415; 473/451, 468, 498–499, 473/504, 564–565, 598, 600, FOR. 102, FOR. 135, 473/FOR. 169, FOR. 192; *A63F 13/12*
See application file for complete search history.

(56) References Cited

U.S. PATENT DOCUMENTS
6,322,455 B1 * 11/2001 Howey ......................... 473/168
(Continued)

FOREIGN PATENT DOCUMENTS
DE      195 05 826      8/1996
(Continued)

OTHER PUBLICATIONS

Channel 9 Perth Media Release, "Nine Unveils New 'Hot Spot' Cricket Technology", Mar. 27, 2007, <http://www.9perth.com.au/News/Item126.aspx>.

*Primary Examiner* — Arthur O. Hall
(74) *Attorney, Agent, or Firm* — Greer, Burns & Crain, Ltd.

(57) ABSTRACT

A method and an apparatus are described for determining parameters of a contact between bodies occurring within an activity. A digital camera directed towards a target area during the activity captures image frames including infra red image data. Structure for comparing image data for multiple temporally spaced frames with image data of a reference datum records any localized infra red emission appearing in at least one incident frame. The image data for at least one of the incident frames is analyzed to determine at least one parameter of the contact, and the image data for the incident frame is recorded. Visual display means displays the incident frames including the image data in the IR spectrum to enable visual inspection of the activity in the target area at the time of the incident frame and that gave rise to the contact producing the infra red emission.

10 Claims, 4 Drawing Sheets

U.S. PATENT DOCUMENTS

| | | | |
|---|---|---|---|
| 6,476,812 B1* | 11/2002 | Yoshigahara et al. | 345/427 |
| 6,522,312 B2* | 2/2003 | Ohshima et al. | 345/8 |
| 6,554,706 B2* | 4/2003 | Kim et al. | 463/36 |
| 6,921,332 B2* | 7/2005 | Fukunaga et al. | 463/8 |
| 7,094,164 B2* | 8/2006 | Marty et al. | 473/416 |
| 7,098,891 B1* | 8/2006 | Pryor | 345/158 |
| 7,401,783 B2* | 7/2008 | Pryor | 273/237 |
| 7,646,372 B2* | 1/2010 | Marks et al. | 345/156 |
| 7,775,883 B2* | 8/2010 | Smoot et al. | 463/36 |
| 2005/0064936 A1* | 3/2005 | Pryor | 463/36 |
| 2005/0096111 A1* | 5/2005 | Beck | 463/7 |
| 2006/0063574 A1* | 3/2006 | Richardson et al. | 463/1 |

FOREIGN PATENT DOCUMENTS

| | | |
|---|---|---|
| EP | 1 593 969 | 11/2005 |
| GB | 2 264 358 | 8/1993 |
| WO | WO 87/01295 | 3/1987 |

* cited by examiner

DETECTING CONTACTS DURING SPORTING ACTIVITIES ETC

CROSS REFERENCE TO RELATED APPLICATION

This application relates to the same general subject matter as AU innovation patent No. 2006100154 and AU patent application 2006906528 and the entire contents of the specifications of those patents are incorporated herein by this cross reference.

BACKGROUND

1. Field of the Invention

This invention relates to determining the existence and/or a property (such as the location) of a contact such as a ball bounce in a sporting activity or the like.

2. Background of the Invention

The invention has been particularly developed for determining the location of the bounce point of a tennis ball in relation to the court line markings so as to enable objective determination whether the preceding tennis stroke has complied with the rules of tennis or whether the point of bounce is outside of the relevant court lines. The invention, however, is not limited to this particular field of application. For example the invention can be used in cricket to determine if the ball has contacted the edge of the cricket bat before being caught by a fieldsman and hence to determine objectively if the batsman has been dismissed under the rules of cricket. The invention may also be useable with other sporting, game, recreational, or entertainment activities where parameters of a contact can be relevant to some aspect of the activity Examples only of such activities and such contacts include:

- in the sport of basketball where contact of a player with a part of an opponent's body may constitute a foul under the rules of basketball;
- in the sport of boxing a contact involving the gloved fist of a boxer against allowable parts of the body of the opponent may score points for the boxer, or contacts and other parts of the opponent's body may incur penalties or warnings under the rules of boxing;
- in the sport of volleyball, simultaneous contact of the ball with two hands is required for a legitimate strike of the ball under the rules of volleyball;
- in the sport of tennis, apart from legality of a shot depending on where the ball bounces, the nature of contact of the ball with the racket strings, e.g. to impart particular spin to tie ball, may be desirably monitored particularly in coaching of a tennis player;
- in the recreation or entertainment of dancing or in the sport of gymnastics, the locations of foot falls on the arena surface of the participants may be desirably monitored particularly in training or coaching of such participants;
- in motor car or motor cycle racing, the nature and location of the contact of the vehicle tyres with the road or track surface may be desirably monitored as indicative of the performance of the vehicle or behaviour of the driver/rider and this may monitoring be useful particularly in adjusting the technical features of the vehicle or in training or practice of the driver/rider;
- in "Australian Rules" football, whether the ball has touched a goal post can determine the score awarded;
- in soccer, hand contact with the ball to block or control its movement is mostly illegal so unambiguous detection of such an impact can be useful;
- in baseball and softball whether or not a pitched ball has touched the bat before being caught by the catcher can determine the treatment of the pitch as a strike or as a "foul tip" which means that the batter is out.

Although the invention will be particularly described herein primarily in relation to determining parameters of the bounce of a tennis ball occurring within a tennis game, it is to be understood that the invention is not limited to this particular field of application and, as outlined above, can be applicable to other sporting, game, recreational, and entertainment activities.

The determination of the point at which a tennis ball bounces in relation to the line markings or boundaries of the tennis court determines whether the stroke is called legal or is illegal or "out" according to the rules of tennis. Such calling of bounce points is a skilled exercise and in professional tournaments a central umpire and many lines persons located around the tennis court continuously monitor the bounce points to call the shots legal or "out". There is much dissension evident in tennis tournaments concerning the validity of calls made by the umpire and lines persons.

To help alleviate such dissension some electronic aids have been proposed or used in the past. These have been based on one of three principles:

(1) Impact sensors placed within the court surface so that when a ball strikes the ground, the sensors at that location record the impact and the resulting signals can be monitored to determine objectively whether the bounce point was within or outside the court boundary lines.

(2) Light beams have been projected along and transverse to the tennis court in the vicinity of the boundary lines so that when the tennis ball strikes the surface and interrupts the beams, the exact location of the bounce point can be determined from the interrupted beams and hence an objective determination made whether the bounce point is within or outside of the court boundary lines—an apparatus based on this principle is used in some tournaments and is known by the trade mark "Cyclops".

(3) Images of the tennis court and surrounds are captured by multiple cameras located at known positions wound the court and these cameras continuously capture images including images of the ball in flight which are then analysed to determine trajectories of the tennis ball enabling computation of bounce points by interpolation within the computed trajectories. A simulation of the ball bouncing on the court surface including location of any adjacent court boundary lines can then be displayed for a viewer of the display simulation to determine whether the bounce point was within or outside the court boundary lines. A system based on this general principle has been used in tournaments and is known as the "Hawk Eye" system, These systems can have one or more limitations such as expense of the hardware systems and installations thereof; the difficulty and precision required in providing calibrating or testing and operating of such systems at a tennis venue; limitations on applicability throughout a tennis game since there can be many movements of bodies and many impacts on the court surface during a tennis game that can be registered by such apparatus and, unless accurately discriminated, could lead to false indications—for example the "Cyclops" system is generally used only for determining the bounce point of a tennis player's serve and not subsequent tennis shots.

SUMMARY

It is an object of the present invention to provide methods and apparatus for determining parameters of contact occurring within an activity and which can provide at least a useful alternative to other systems aimed generally at performing similar functions.

According to a first aspect of the present invention there is a method of determining parameters of a contact between bodies occurring within an activity, particularly within a sporting, game, recreational or entertainment activity, the method including the steps of:

directing a digital image capture apparatus, such as a digital camera, towards a target area during the course of the activity and capturing thereby image frames of the target area including image data in the infra red region of the spectrum, said image data in the infra red region of the spectrum including any localised infra red emission appearing in at least one incident frame, such localised infra red emission being indicative of heat having been generated by a contact which has occurred in the target area and which has generated heat, such as by friction between the bodies or by deformation of at least one of the bodies involved in the contact, recording the image data for the at least one incident frame, selectively displaying the at least one incident frame by visual display means including the image data in the infra red region of the spectrum by presenting infra red image data in a visible display of the scene captured for the incident frame so as to enable visual inspection of the activity in the target area at the time of the at least one incident frame and that gave rise to the contact producing the infra red emission, and analysing the image data for at least one of the incident frames to determine at least one parameter of the contact.

Preferably the image capture apparatus, such as the digital camera, is operative to generate image data for visible parts of the spectrum in addition to image data in the infra red spectrum, the image data in the visible parts of the spectrum being also recorded for the at least one incident frame, and wherein the step of selectively displaying the incident frame(s) comprises displaying the image data from the visible parts of the spectrum so that the displayed image includes a more naturally recognisable scene of the target area in the visible parts of the spectrum and the image data relating to the localised infra red emission is superimposed in a contrasting display on the scene in the visible parts of the spectrum so that evidence of the contact is readily visible superimposed on the visible scene of the target area. In this embodiment preferably the image data captured for the visible spectrum comprises for each pixel of each frame net light intensity in the visible parts of the spectrum, such as a grey scale measure or luminance measure, and for each pixel an infra red emission intensity is also recorded as the image data in the infra red a region of the spectrum.

Preferably the method includes the further step of comparing image data for multiple temporally spaced frames with image data of a reference datum so as to detect any localised infra red emission indicative of heat having been generated by a contact by recording any significant increase in the intensity value of the infra red emission within at least one corresponding pixel of successive frames.

This significant increase can be detected by searching and analysing the image data for multiple fames to detect the data for a pixel having the highest value infra red emission of all the frames searched and analysed. Effectively this process involves comparing the image data with image data of a reference datum constituted by the complete set of data from all the frames searched and analysed.

Alternatively the step of comparing image data for multiple frames with image data for a reference datum may include comparing the image data for each frame with corresponding image data for preceding frames of captured image data for the same target area so that the image data of the reference datum relates to the target area immediately or shortly before the contact generating the infra red emission. The comparison can then detect and record a substantial increase (e.g. beyond a predetermined threshold, which may be an absolute value or a percentage) in the intensity value of infra red emission for a corresponding pixel in successive frames.

The step of comparing image data to detect a localised infra red emission may be performed automatically, particularly by execution of an appropriate algorithm by programmed processing means so as to identify the incident frame. The incident frame, or perhaps the frame automatically detected as being the most probable incident frame of interest (e.g. the one having the pixel with the highest value of infra red emission) may then be automatically, or selectively in response to user command, displayed on the visual display means as the relevant captured image of the target area. In one possible embodiment, the process may include the further step of selecting an incident zone within the image of the target area for the displayed incident frame, the incident zone being a selected area within the displayed image in which the localised infra red omission of interest is identified. Preferably the process then includes the further step of further processing the image data for pixels within tee selected incident zone to enhance in the image presented by the visual display means the visibility of the infra red emission sources in the captured image. For example, the image data for pixels within the selected incident zone may be processed, e.g. by a digital filtering operation, to enhance the contrast or brightness of pixels having a relatively high infra red emission value compared to nearby pixels. Software for enhancing contrast or brightness is known and commonly provided with picture or image processing software. The selection of the incident zone from within tee displayed image may be carried out for example by a user operating an interface device such as a computer mouse to select the area of the displayed image where the localised IR emission of interest is identified by the user inspecting the display. For example, a curser on the displayed image can be positioned at the image of the IR emission and, upon the user clicking upon that point, the associated software can then automatically enhance the visibility of the IR emission source by enhancing contrast or brightness for the selected pixel and preferably for numerous nearby or contiguous pixels, or for pixels having relatively high IR emission values at, adjacent and/or surrounding the selected point, As an alternative to positioning a curser at a single point, a box may be drawn around the display image area where the localised IR emission of interest is identified, e.g. by positioning a curser and then dragging across the area of interest to create a box constituting the selected area, and the filtering to brighten or increase contrast can be performed only on data for pixels within the box. For example, the filtering can increase contrast of those pixels that have beat values within say 2% of the maximum heat value.

Another step of the process that may be performed in a preferred embodiment comprises enhancing the displayed images to enable better user discrimination of features in captured images of the target area. Apart from the enhancement of the IR emissions discussed above, another useful enhancement may comprise image data processing to increase contrast and/or brightness of playing area features such as lines on a tennis court. When a tennis court is in deep shade the IR emission differences between lighter more reflective (and hence cooler) lines and surrounding court surfaces can reduce to make visual discrimination of lines in the displayed image. Upon user selecting e.g. by positioning a cursor on a known image section representing a court line marking, and upon clicking thereon, the processor may filter all data for that image to enhance brightness of all pixels having a substantially identical IR heat value to the selected pixel, say within 2% of that heat value. This will brighten the court making lines in the displayed image.

Another process to enhance visibility and/or automatic determination of relevant non-IR emission sources such as tennis court line markings may comprise filtering to enhance image data for a particular part of the visible spectrum. For example, line markings may incorporate say a yellow or orange reflective component and a filtering process may be performed to increase the brightness count for this part of the spectrum in the captured images, thereby enhancing visibility of the line markings in a displayed image and/or improving the accuracy of image analysis software to automatically discriminate the line markings.

The analysing step preferably includes verification of the or each incident frame as being indicative of a legitimate event in the activity giving rise to a contact of interest by analysing parameters of the infra red emission as recorded in the infra red image data including at least one of;

analysing the shape and/or size of the contact area exhibiting emissions in the infra red part of the spectrum and represented by contiguous pixels of the captured image frame,     analysing an infra red signature indicative of a contact of the type of interest such as the infra red spectral emission characteristics indicative of a pre-determined temperature change,     analysing the duration of decay of the infra red emission in the cluster of contiguous pixels over excessive frames, and     analysing the location of tie cluster of contiguous pixels having significant infra red emissions within the target area of the activity.

The analysing step may include one or more operations performed manually by an operator of the process, particularly analysing the location of the heat generating contact within the target area—e.g. to consider that location in relation to the rules of the game being monitored. Such analysis may comprise observing the display of the incident frame(s) and determining the location. Also, a step of analysing the shape and/or size of the contact area exhibiting the infra red emissions may be performed by visual inspection of the display and discriminating therefrom whether the heat generating contact is a contact of interest. Such a step of analysing shape and/or size can also be performed automatically by image analysis software to discriminate a heat generating contact of possible interest from one unlikely to be of interest (e.g. an elongated skidding contact of a tennis players' foot compared to a ball bounce).

In the preferred embodiment the step of recording the image data for the at least one of the incident frame comprises recording the image data for several frames preceding the incident frame, or preceding each incident frame, or preceding the first of a number of successive incident tames, and the step of displaying the incident frame(s) being preceded by displaying images from the preceding recorded frames so that a sequence of frames leading up to and including the at least one incident frame is displayed to the user.

In one possible embodiment the step of displaying the at least one incident frame by visual display means is carried out in response to user initiation of a display command.

The step of analysing the image data to determine at least one parameter of the contact may be used to initiate generation of a signal indicative of a predetermined parameter of the contact.

In a case where the activity is a tennis game, the target area can comprise at least part of the tennis court within boundaries defined by outer sidelines and base lines and the contact causing at localised infra red emission comprises impact of the tennis ball with the tennis court surface and the step of analysing the image data to determine at least one parameter of the impact of the tennis ball comprises at east determination of the existence of an impact of the tennis ball with the court surface. Preferably also the analysing step includes determination of the location of the contact or impact of the tennis ball with the court surface in relation to the tennis court line markings delineating the legitimate zones of play. This can enable performance of a further process step of automatic analysis, e.g. by computer image analysis, and automatic generation of an alert signal (e.g. audible signal) if the analysis determines the contact point of the tennis ball is outside the permissible area according to the rules of tennis.

In another case where the activity comprises a cricket game, the target area comprises a cricket game, the target area comprises at least part of the cricket pitch where a batsman is stationed and wherein the contact causing localised infra red emission comprises a contact involving the cricket ball, the contact also involving at least one of the following objects within the target area, namely the cricket bat, apparel being worn by the batsman, accessories being worn by the batsman including protective pads, gloves and helmet, and parts of the body of the batsman; and wherein the step of analysing the image data to determine at least one parameter of the contact of the cricket ball comprises at least determination of the existence of a contact of the cricket ball with at least one of the said objects.

In a further possible embodiment of the method, the activity comprises a game which involves a player who uses an implement to strike a projectile, the target area comprises at least an area where the player is stationed when using the implement to strike the projectile, and the contact causing localised infra red emission comprises a contact of the implement with the projectile, and wherein the step of analysing the image data to determine at least one parameter of the contact comprises at least determination of the location on the implement where contact with the projectile occurs.

According to a second aspect of the present invention there is provided a method of determining parameters of a contact between bodies occurring within an activity, particularly within a sporting, game, recreational or entertainment activity, the method including the steps of:

directing a digital still camera having both visible spectrum and infra red spectrum recording functionality towards a target area during the course of the activity and capturing thereby a single image frame of the target area including both visible spectrum image data and image data in the infra red region of the spectrum, the digital still camera being calibrated to record the existence and location of a localised infra red emission indicative of heat having been generated by a contact between bodies which has occurred a short time before the image capture in the target area and which has generated heat by friction between the bodies or by deformation of at least one of the bodies involved in the contacts,     recording the visible and infra red image data for the frame, and     displaying the fame by visual display means including the image data in the IR spectrum by presenting IR data as a visible display of the scene captured for the frame superimposed on tie visible spectrum display so as to enable visual inspection of the activity in the target area at the time of the frame and that gave rise to the contact producing the infra red emission.

According to a third aspect of the present invention there is provided an apparatus for determining parameters of a contact between bodies occurring within an activity, particularly within a sporting, game, recreational or entertainment activity, the apparatus including:

a digital image capture apparatus, such as a digital camera, directed towards a target area during the course of the activity and for capturing thereby image frames of the target area including image data in the infra red region of the spectrum, said image data in the infra red region of the spectrum including any localised infra red emission appearing in at least one incident frame, such localised infra red emission being indicative of heat having been generated by a contact which has occurred in the target area and which has generated heat, such as by friction between the bodies or by deformation of at least one of the bodies involved in the contact, analysing means for analysing the image data for at least one of the incident frames to determine at least one parameter of the contact, recording means for recording the image data for the at least one incident frame, visual display means for selectively displaying the at least one incident frame including the image data in the infra red region of the spectrum by presenting infra red image data in a visible display of the scene captured for the incident frame so as to enable visual inspection of the activity in the target area at the time of the at least one incident frame and that gave rise to the contact producing the infra red emission.

The apparatus may further include comparing means for comparing image data for multiple temporally spaced frames with image data of a reference datum so as to detect any localised infra red emission indicative of heat having been generated by a contact by recording any significant increase in the intensity value of the infra red emission within at least one corresponding pixel of successive frames.

According to a yet further embodiment of the invention there is provided a method of determining parameters of a contact between bodies occurring within an activity, particularly within a sporting, game, recreational or entertainment activity, the method including the steps of:

using a camera to capture image data for multiple successive image frames;

feeding image data, including infra red data values to a computer;

storing image data in a short term buffer memory (whilst overwriting oldest data);

in real time providing a visual display of the image fames;

inputting a command to stop capture, e.g. several seconds after an incident in the activity of potential interest;

automatically searching data in the buffer memory to select the frame with highest infra red data value;

displaying an image of the captured frame having highest recorded infra red data value;

inspecting tie displayed image and deciding if a contact of relevance or interest is present;

if "yes", selecting an image point or zone where the contact is identified e.g. by a point and click operation, or by a selection box created by dragging a cursor across the contact zone in the displayed image;

automatically processing the image data at or around the selected image point or within the selection box to accentuate visibility of the source of increased infra red emissions;

displaying enhanced image data for frames at and around the incident frame and, upon user command, generating on the visual display a slow motion replay of the images of the activity in the target area for several frames preceding the heat producing contact and for multiple frames after the contact;

In this method, preferably image signals, after the incident frame has been verified and the infra red emissions from the relevant contact enhanced, are supplied for further use selected from: being supplied to long term memory for later selective replay for analysis, entertainment, or training; being supplied to an audience at the location of the activity (sporting venue for example); being supplied to an umpire or, referee for review and judgment; being supplied to television commentators and audience for discussion and entertainment.

BRIEF DESCRIPTION OF THE DRAWINGS

Possible and preferred features of the present invention will now be described with particular reference to the accompanying drawings. However it is to be understood that the features illustrated in and described with reference to the drawings are not to be construed as limiting on the scope of the invention. In the drawings.

DETAILED DESCRIPTION

Figure 1:
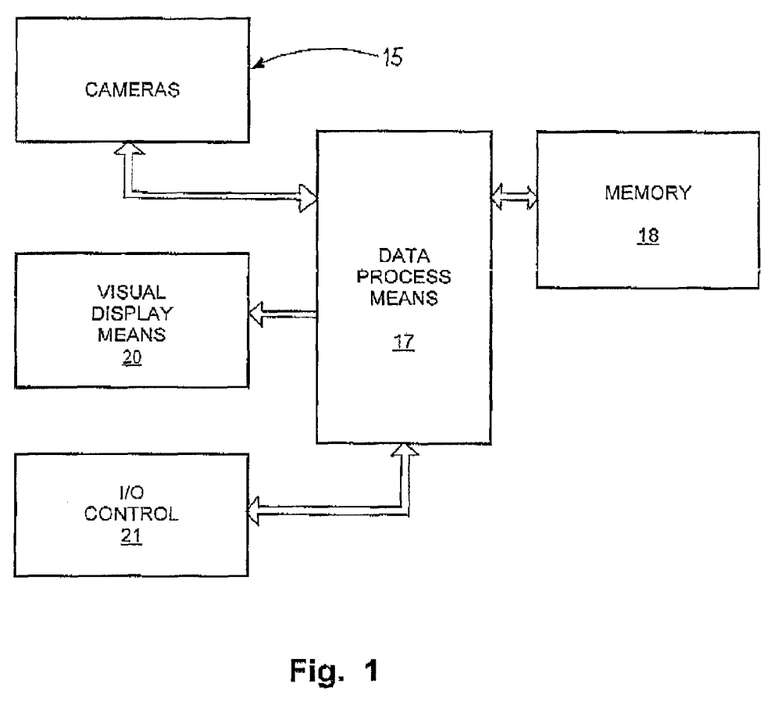
FIG. 1 is a schematic view of an apparatus according to an embodiment of the present invention.

The apparatus in FIG. 1 includes one or more digital cameras 15 directed in use towards a target area such as a sporting, game, recreational, or entertainment area, or area where an activity is to be undertaken. Camera 15 need not be fixed in location but could be movable by an operator, and indeed could be hand held since the process and operations of the invention can be performed provided the camera is directed to the target area when the particular contact incident of interest occurs. The camera could be a digital "still" camera operated to capture an image of the target area shortly after the contact of interest occurs. However for most purposes the implementation of the invention will involve at least one digital video camera which in use is mounted in a known location and is directed towards a respective target area during the course of the activity so as to capture image frames of the target area. A camera capturing frames at 92 frames per second has been successfully tested in a trial of the invention, The camera(s) 15 used in the present invention captures image data in the infra red region of the spectrum. The captured image frames therefore comprise sets of pixels each of which includes image data for infra red emissions detected by the camera arising from within the target area. The infra red data may include spectral data indicative of the temperature of respective locations within the target area giving rise to the infra red emissions (or reflections), or may include infra red emission intensity data, or may include both, If desired however the camera may be constructed or calibrated to record only infra red radiation within a predetermined pan of the infra red spectrum selected so as to record infra red emissions from contacts of the kinds of interest (further discussed below) with only the intensity of the detected radiation in that part of the I.R. spectrum being recorded as the infra red data for each image frame.

Preferably the cameras 15 also record image data in the visible part of the spectrum so that for each pixel of each image frame there is not only I.R. data recorded but also visible spectrum data recorded. The visible spectrum data may comprise only, or at least, net light intensity in the visible part of the spectrum, such as a grey scale measure or luminance measure, so that by generating an image on a visual display apparatus using the visible spectrum intensity data, a monochrome or grey scale image of the target area is produced for each recorded image frame. This kind of display of course will be familiar to and readily understandable by the user and will enable the user to naturally visualise the target area by viewing the visual display. A suitable digital camera records for each pixel a 14-bit value representing greyscale intensity and IR emission intensity for the respective point of the target area imaged by that pixel. However if desired, each camera may be colour digital video camera capturing colour data such as RGB values for each pixel of each image frame captured (in addition to the IR data). Suitable cameras are made by Cedip of France (www.cedip-infrared.com). The colour data capture may be generally conventional and need not be further described.

The image data captured by the cameral 15 is fed to the data processing means 17 which can be a general purpose computer running the required software for image data capture, storage, processing etc. Associated with the data processing means 17 is memory 18 where the image data can be stored and from which the data can be recalled 20 for processing and output to displays and the like. A visual display means 20 associated with the data processor 17 can comprise a conventional visual display unit of a computer or multiple such display units. Other conventional peripherals such as I/O control 21 (eg keyboard, mouse, joy stick, etc.) will be provided for obvious purposes. The display 20 can include a visual display provided for example adjacent the target area where the activity is taking place, eg adjacent a tennis court where an umpire or referee can view the display unit and in particular can view replayed image frames of tire target area to enable viewing of the tennis ball bounce or other contact of interest in the target area. The umpire or referee may have a control unit 21 to instigate replay of image frames captured and stored by the apparatus for repeated viewing and assessment. Likewise the display 20 can be provided in a coaching or training situation for a coach or players to view and review the recorded image frames for learning or other analysis purposes. Another possibility is that the display 20 comprises a large scale visual display provided at a venue of the activity, eg a large scale display provided to an audience viewing a tennis match so that the audience can see a replay of image frames of the target area from a preceding incident in the tennis game. Again another type of display 20 can comprise external displays to which the recorded image frames can be transmitted eg by television transmission or other transmission medium to reach external displays such as television sets of an audience located distant from the sporting venue. Another display 20 preferably used simultaneously in conjunction with any of the preceding displays is a monitor which a technician controlling the process or apparatus views to initiate or modify or terminate certain operations as required, e.g. to initiate a replay, or repeated replays, of displays of captured images.

Figure 2:
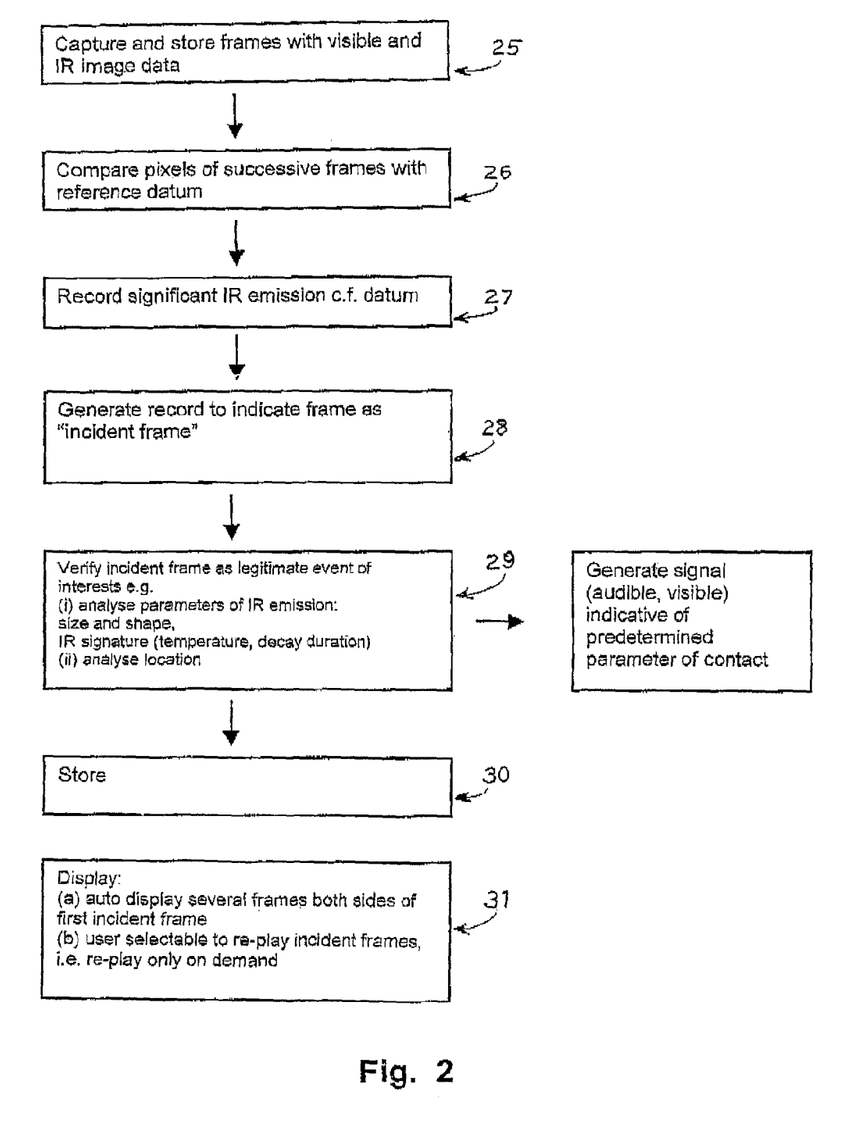
FIG. 2 is a flow chart of possible data processing operations in an apparatus of the present invention.

Referring to FIG. 2, the fractions of the processor 17 can include those illustrated in the flow chart These processes comprise:

(25) Capturing, eg by means of conventional frame grabber means, multiple successive age frames from the outputs of cameras 15, this data including image data in the infra red region of the spectrum and preferably also from the visible spectrum and lo storing this data for each frame in memory 18 for later processing. Conventional software can be used for capturing and storing image data, including if desired some preliminary processing such as filtering and perhaps data enhancement such as magnification of IR data, whether universally or when multiple adjacent pixels indicate increased IR emissions relative to a datum such as a mean IR intensity level. The captured data for the is multiple successive frames may be stored in memory 18 which may for example include a buffer memory to store a predetermined duration only of activity in the target areas, say 10 to 15 seconds. That is, newly recorded image data will continually overwrite image data from a past time. But this length of time will be sufficient for many uses of the process and apparatus since an operator can selectively stop the capturing process, e.g. by hitting the space bar of a keyboard, and initiate processing and/or viewing and/or replaying of the image frames including incident frame(s) having a contact of interest in the activity.

(26) The image data, particularly the IR data of the pixels of successive captured image frames is compared with a reference datum. The reference datum provides a base enabling detection of any localised, new or transient infra red emission. Therefore the reference datum may for example comprise:

(a) corresponding pixels of an immediately preceding mage frame, (b) image data from a frame recorded several frames before the subject frame, (c) an average of several preceding frames, (d) a single calibration frame or an average of several calibration frames captured for the target area captured prior to the "live" recording of image frames during the course of the sporting activity, or (e) the set of captured image data for all of the multiple successive frames (from which the highest IR emission level, i.e. the "hottest pixel", from all frames can be detected e.g. by searching all pixels for the pixel data containing the highest IR value, which can be verified as a relevant contact or impact by comparing the IR value of the same pixel with a preceding frame).

(27) The detection of any significant IR emission compared to the reference datum is recorded for the respective frame and the frame is noted as an "incident frame" in which there has been a possible or actual localised infra red emission indicative of heat having been generated by a contact which has occurred in the target area and which has generated beat such as by friction between the bodies engaged in the contact (eg the tennis ball contacting the court surface) or by deformation of at least one of the bodies involved in the contact.

(28) There may be generated a record or a marker to indicate the relevant frame as an "incident frame", such record or marker comprising for example a data tag associated with the data set for the image frame or perhaps recording in a register other data such as frame number, time of incident, etc. The record or marker is useable to readily identify the incident frame. This is to enable later selective recall and display of the incident frame.

(29) The image data for the incident frame is analysed to determine at least one parameter of the contact.

(29)(continued) The most basic parameter to determine is whether the incident frame has indeed recorded a contact of the kind of interest, such as a tennis ball bounce. To enable verification of the incident frame as having recorded a legitimate contact of interest, parameters of the recorded infra red emission can be analysed, such parameters including eg (i) the size and shape of the contact as represented by the contiguous cluster of pixels all recording simultaneously the notable increase in the temperature indicative of a frictional contact, the size of the contact needing to be commensurate with the size of a tennis ball (which can be empirically determined by test runs of the apparatus) and the shape of the imprint being substantially as expected, particularly generally elliptical with the long axis in the general direction of travel of the tennis ball. Another parameter of the IR emission enabling verification may be (ii) the infra red signature of the frictional contact, such signature including the change in temperature at the point within the target area being consistent with a frictional contact of interest (again something which can be empirically determined by repeated tests of the apparatus). Another signature may be (iii) the duration of decay of the IR emission—for example it may be determined that the infra red emission from a contact of interest can decay over one or several seconds with a hyperbolic IR intensity decay pattern—this type of verification necessarily entailing analysis of multiple successive image frames in which infra red emission from the same point are detected.

(29)(continued) The other parameter of the contact that will be important to analyse in most fields of application of the invention comprises the location of the contact. In particular, in the analysis of the tennis ball bounce, the location of the point of bounce in relation to the court boundary lines can be important. In some embodiments and uses of the invention, the location of the contact point can be determined by the user, eg by an umpire viewing the display 20 when at least one of the incident frames is displayed by the unit 20. That is, the umpire can inspect the displayed incident frame (s) and preceding and succeeding frames if desired, and can analyse and determine the location of the bounce point in relation to the boundary lines of the court. However the invention can also provide automated analysis of the incident frame or frames in determination of the exact location of the contact. For example, the processor 17 may have programmed therein, or stored in look-up tables, or may be able to actively analyse image data captured to determine the spatial relationship of the contact point to other spatial parameters, particularly tennis court lines. For example, the processor may analyse the captured data to discriminate tennis line markings which are provided in contrasting colour to the major part of the tennis court surface such as by using conventional image analysis software to discriminate transitions between areas of different colour or reflectivity (court surface versus marked boundary lines) and to interpolate between discriminated colour transitions in cases where the line markings may be damaged or shed or dirty etc. and hence derived mathematically accurate delineations of the court line markings. This "virtual image" of the court line markings can then be superimposed with the derived location of the bounce point and a determination automatically made whether the bounce point falls legally on or within the boundary lines or whether the bounce point is outside the lines. In response to determination of a bounce point falling outside the boundary lines, the system may be operable to generate the signal indicative of that particular parameter of the contact. The signal may be used to initiate the generation of an audible and/or visible alarm in the area where the activity is being performed. This can substitute for the call made by a lines person at a tennis tournament.

(29)(continued) Another to of analysis of parameters of contact in the sport of cricket entails determining the occurrence of a contact and also for deter with certainty which bodies or articles have been involved in the contact. Examples of contacts which can occur in cricket and their significance include:

(i) contact of ball with bat—relevant to determine if a fielder ten catching the ball dismisses the batsman, (ii) contact of ball with protective pad on batsman's shin and knee—relevant to determine if a fielder then catching the ball dismisses the batsman, (iii) contact of ball with both bat and pad and in what order or succession 0 relevant to determine if batsman may be dismissed "leg before wicket" (if ball contacted pad first).

(iv) contact of ball with batsman's glove—relevant to determine if a fielder then catching the ball dismisses the batsman.

(v) contact of ball with the ground just before a fielder catches the ball—relevant to determine if the ball has cared to the field to legitimise a dismissal of the batsman.

(vi) Contact of the bowler's foot with the pitch near or beyond the line known as the "crease" in bowling the ball towards the batsman—relevant to determine if the bowler has performed an invalid delivery known as a "no ball".

(29)(continued) Analogous to these uses for cricket, in baseball and softball a contact incident of interest can be contact of the ball with the batter's bat momentarily before being caught by the catcher (known as a "foul tip"). Objective verification of the contact is possible because of the IR emission from the edge of the bat.

(30) The system can, and desirably does, record for those incident frames which have undergone the verification and analysis processes the further results of the analysis and verification so that the incident frames can be flagged and selectively recalled with precision by operators of the system. The storage of incident frames (and preferably ?? immediately preceding and succeeding frames) and if claimed results of analysis and verification such as indicative data flags or markers, may be initiated automatically when such frames have been selectively replayed or initiated by operator intervention such as by an operator inputting a command to store the frame(s) in a more permanent store than the 10-15 second buffer).

(31) The system provides for selectively displaying incident frames by the visual display means 20 to enable visual inspection of the activity in the target area that gave rise to the contact producing the infra red emission. The display will include display of image data in the infra red spectrum which will be presented as a visible display of the scene captured for the incident frame. That is, the IR data will be presented as a visible incident by the display 20 by generating a false colour or false image intensity to be presented by the display. As mentioned above, the cameras 15 preferably record data in the visible part of the spectrum and this visible spectrum data is used to generate on the display a naturally recognisable scene of the target area. With this system the image data relating to the localised infra red emission are used to produce superimposed on the natural scene a contrasting display in the visible part of the spectrum (eg in false colour or enhanced colour or enhanced intensity) so that the contact event is readily visible superimposed on the natural visible scene of the target area. For example, visible spectrum data can be used to produce a monochrome image of activity in the target area readily recognisable to a viewer while the IR data over a threshold can be presented as areas of strongly increased brightness. The display 20 may present under the control of the processor 17 a sequence of several recorded frames preceding and succeeding the start of the detected IR producing contact. In the case of a ball bounce this will mean a display s of frames showing the ball moving towards the court surface, bouncing thereon leaving the IR "imprint", and continuing to travel upwardly away from the bounce point, Such a display is not an artificial simulation of the bounce, it is a real image merely also showing the heat imprint of the bounce point enhanced and superimposed so as to be visible on the natural scene. Because line markings on a tennis court surface are generally lighter coloured (more reflective) than the court surface, they may be recorded as darker (i.e. cooler) than the surrounding areas of court surface—therefore to make the display more natural in appearance, the displayed images on the visual display may be "negative" or reversed images. This will make the hot spot caused by a ball bounce to be presented as a darker imprint on the court or line surface. If desired, the control 21 associated with the display 20 can be operated by a user to play or replay the sequence of recorded image frames with the enhanced infra red bounce imprint only on demand, eg in the case of a disputed line call of a lines person at a tennis tournament. Of course such displays of replays of the incident can be made to the audience at the sporting venue, or via television transmissions for enhanced entertainment.

A possible complete process performed according to a preferred embodiment of the invention can comprise the following:

Camera captures image frames as 640 by 512 pixel array, each pixel having a 16 bit value containing visible spectrum data and IR data Image data, including IR values, are fed to computer.

Store data in short term buffer memory (overwriting oldest data).

Real time visual display of image frames.

User inputs a command to stop capture, e.g. several seconds after the incident of potential interest.

Program searches data in buffer memory to select frame with highest IR value.

Display of image of captured frame having highest recorded IR value.

User inspects displayed image and decides if contact of relevance or interest is present.

If "no" (e.g. if high IR value is result of "flare" such as a solar reflection to the camera from an article in the target area), user can input a command, e.g. striking "N" key of a keyboard, to initiate a further search by the program for the next highest IR value (perhaps limited to a search more than, say, 5 frames away from the first selected frame) and the image frame of which is then displayed.

If "yes", user selects an image point or zone where the contact is identified e.g. by a point and click operation, or by a selection box created by dragging a cursor across the contact zone in the displayed image.

Program processes the image data at or around the selected image point or within the selection box to accentuate visibility of the source of increased IR emissions, e.g. by conventional brightness and/or contrast enhancement software, so as to make the displayed image for that frame (and preferably also the displayed images for immediately preceding and most desirably succeeding frames) clearer for user visualisation of the location and/or nature of the contact.

Enhanced image data for frames at and around the incident frame or first incident frame is displayed. Upon user command, a slow motion replay of the images of the activity in the target area for several frames preceding the heat producing contact and for sufficient frames after the contact is generated on the visual display.

Image signals particularly after the incident frame has been verified and the IR emissions from the relevant contact enhanced, are supplied for further use—e.g. supplied to long term memory for later selective replay for analysis, entertainment, training, etc, or e.g. supplied to an audience at the location of the activity (sporting venue for example), or e.g. supplied to an umpire or referee for review and judgment, or e.g. supplied to television commentators and audience for discussion and entertainment.

Figure 3:
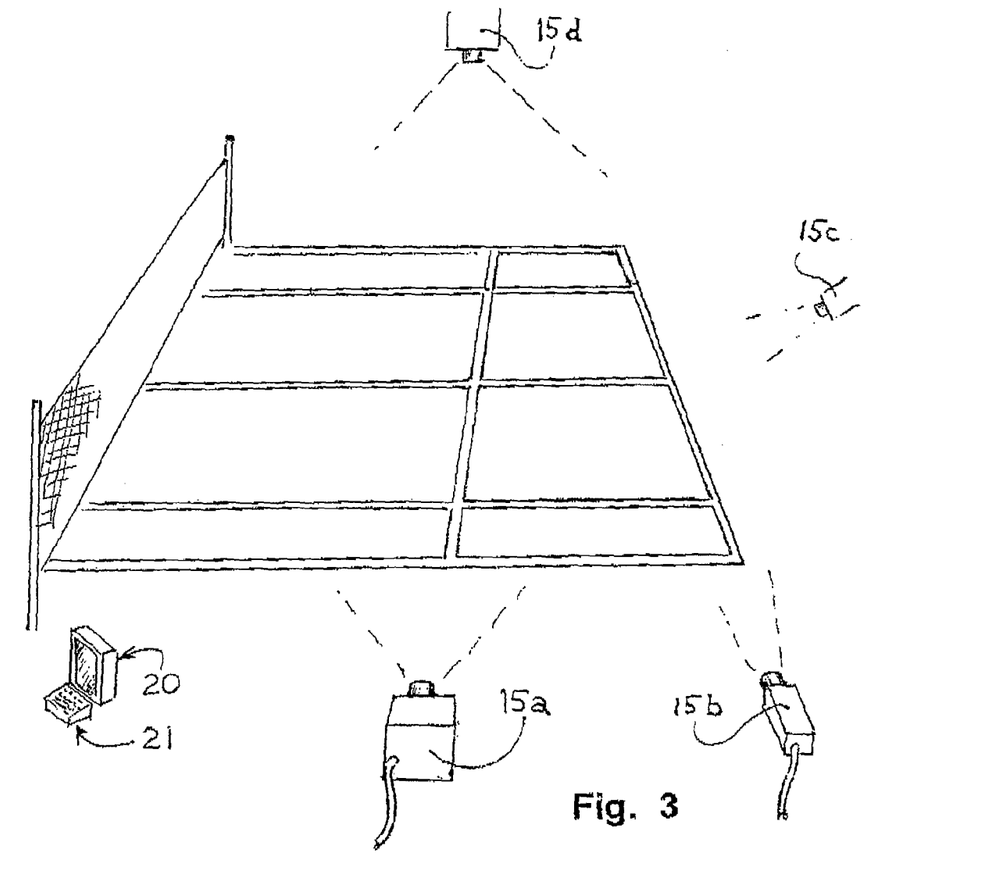
FIG. 3 is a schematic view of cameras placed to capture images of selected target to areas of a tennis court.
Figure 4:
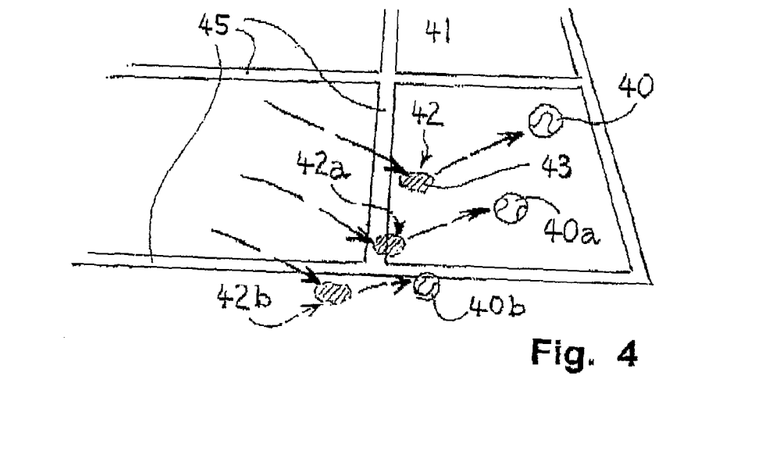
FIG. 4 is a schematic illustration of tennis ball bounces used to illustrate the operation of the present invention.

From the preceding description the possible use of the invention in tennis as depicted in FIGS. 3 and 4 can be readily understood. The cameras 15 continuously (or intermittently if desired) capture video images of target areas of the court, the signals from which are processed and recorded. As shown in FIG. 4, the bounce of tennis ball 40 on the court surface 41 involves some friction at the bounce point 42. The friction generates heat and hence infra red radiation. The area 43 will have a characteristic size, shape and IR emission characteristics (spectral and temporal) which provide an analysable and therefore verifiable signature of the tennis ball bounce, The location of the bounce point 42 in relation to the court boundary lines 45 following a tennis player's serve will show that the bounce point was beyond the service line and hence the serve was a fault. The bounce point 42a from tennis ball 40a is legal. The bounce point 42b of tennis ball 40b is outside the sideline. Recordings of such tennis ball bounces can be replayed on command at display 20 eg by an umpire for manual assessment and call of the legality, or can be automatically analysed and the legality signaled automatically.

Figure 5:
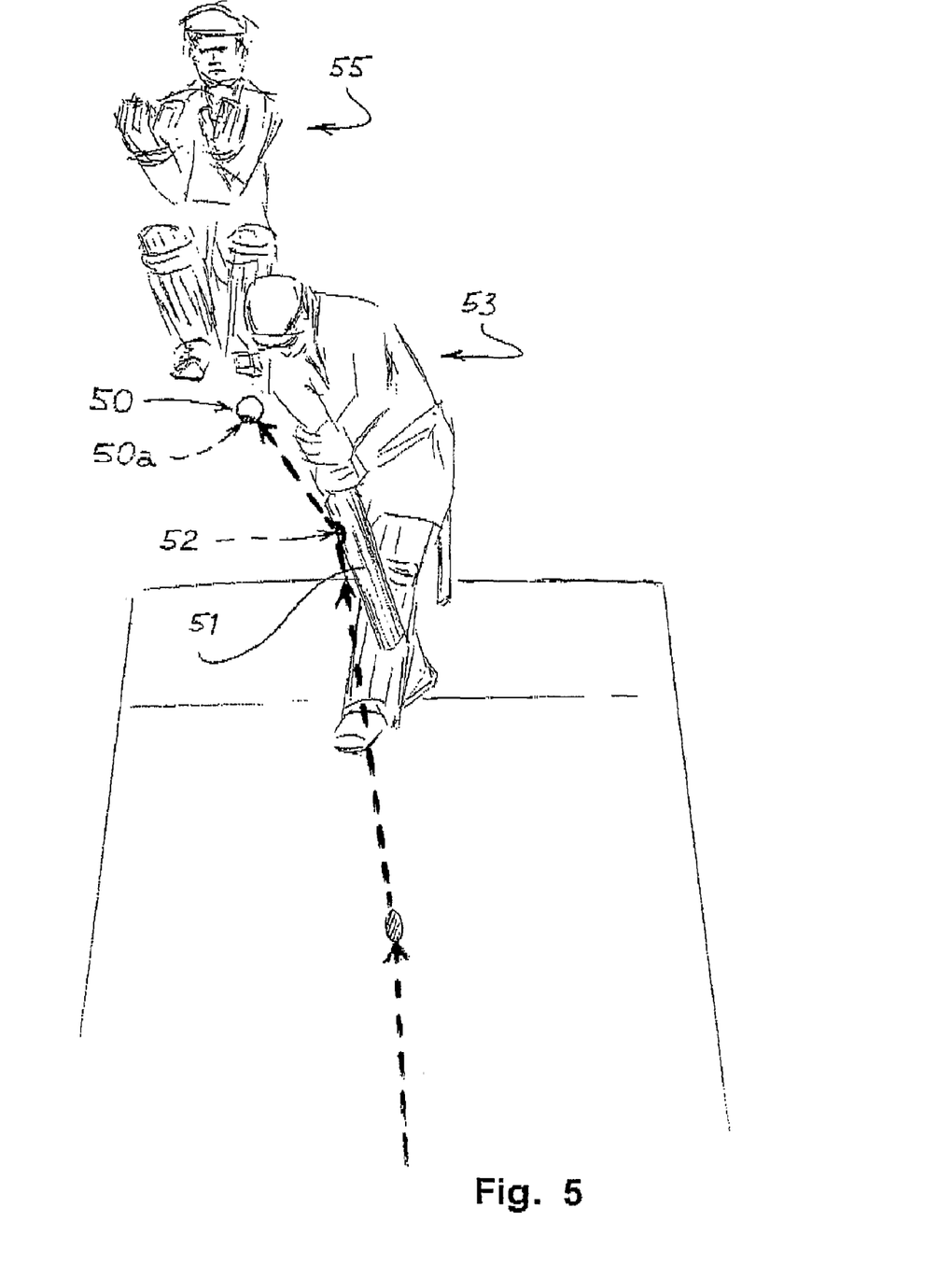
FIG. 5 is a schematic illustration of an incident in a cricket game where the present invention can be used.

In FIG. 5 the contact incident of interest comprises contact of the cricket ball 50 with edge of the bat 51 and the point 52. Such a glancing contact with the edge of the bat 51 can be difficult for an umpire, to detect so that if the ball is caught by the fielder 55 there is uncertainty whether the batsman 53 should be dismissed under the laws of cricket. However with the present invention, the glancing contact at point 52 at the edge of the bat 51 will be a friction event causing an infra red emission detectable using the process and apparatus of the invention. Selective replay by the umpire (who can be off the field of play eg in a studio as is known for higher level televised cricket) can enable ready verification of the existence of the contact 52 with the bat 51 and that off-field umpire can signal accordingly to the on-field officials. It has also been found that there is infra red emission from tie part of the ball surface 50a that has made the contact at point 52, so that the captured and displayed images will also reveal evidence of the contact by the brighter IR emission from a part of the ball surface as it is imaged travelling after the initial incident frame. Such evidence can be used in the analysis step of the invention. The use of the invention in baseball and softball is analogous to the described uses in cricket.

It will be seen that the process and apparatus of the invention provide a useful means for detecting, and in one embodiment automatically analysing and signaling, contacts within sporting and similar activities, particularly location of tennis ball bounce points in relation to the line markings. The system is objective and generates real images of real events, not simulations. The system can therefore provide a most useful alternative to known systems for similar purposes.

The invention claimed is:

1. A method of determining parameters of a contact between physical bodies occurring within a sporting, game, recreational or entertainment activity, the method comprising the steps of:

directing a digital image capture apparatus towards a target area during the course of the activity and capturing image frames of the target area including image data in the infra red region of the spectrum, said image data in the infra red region of the spectrum including localised infra red emission appearing in at least one incident frame, the localised infra red emission being indicative of heat having been generated by the contact which has occurred in the target area and which has generated heat, including at least one of friction between the bodies or by deformation of at least one of the bodies involved in the contact;

recording the image data for the at least one incident frame;

selectively displaying the at least one incident frame by visual display including the image data in the infra red region of the spectrum by presenting infra red image data in a visible display of a scene captured for the at least one incident frame to enable visual inspection of the activity in the target area at the time of the at least one incident frame and that gave rise to the contact producing the infra red emission; and analysing the image data for at least one of the at least one incident frames to determine at least one parameter of the parameters of the contact, and wherein the analysing the image data step includes verification of each incident frame as being indicative of a legitimate event in the activity giving rise to the contact by analysing at least one parameter of the localised infra red emission as recorded in the infra red image data, including at least one of:

analysing at least one of a shape and a size of the target area exhibiting emissions in the infra red part of the spectrum and represented by contiguous pixels of the captured image frame;

analysing an infra red signature indicative of contact consisting of the localised infra red emission characteristics indicative of a pre-determined temperature change;

analysing a duration of decay of the localised infra red emission in the cluster of contiguous pixels; and analysing the location of contiguous pixels having a predetermined amount of infra red emissions within the target area of the activity.

2. The method as claimed in claim 1, wherein the method includes the further step of comparing the image data for multiple temporally spaced frames with the image data of a reference datum so as to detect any localised infra red emission indicative of heat having been generated by contact by recording any increase of a predetermined amount in the intensity value of the localised infra red emission within at least one corresponding pixel of successive frames.

3. The method as claimed claim 1, wherein the step of comparing image data for multiple frames with image data of a reference datum comprises comparing the image data with corresponding image data captured for preceding frames of the same target area so that the image data of the reference datum relates to the target area immediately or shortly before the contact generating the infra red emission.

4. The method as claimed in claim 1, wherein the step of recording the image data for the at least one incident frame comprises recording the image data for several frames preceding the incident frame or preceding each incident frame or preceding the first of a number of successive incident frames, the step of displaying the incident frames being preceded by displaying images from the preceding recorded frames so that a sequence of frames leading up to and including the at least one incident frame is displayed to the user.

5. The method as claimed in claim 1, wherein the step of displaying the at least one incident frame by visual display is carried out in response to user initiation of a display command.

6. The method as claimed in claim 1, wherein the step of analysing the image data to determine at least one parameter of the contact is used to initiate generation of a signal indicative of a predetermined parameter of the contact.

7. The method as claimed in claim 1, wherein the activity is a tennis game, the target area comprises at least part of a tennis court including boundaries defined by outer sidelines and base lines and wherein the contact causing the localised infra red emission comprises impact of a tennis ball with a surface of at least part of the tennis court and wherein the step of analysing the image data to determine at least one parameter of the impact of the tennis ball comprises determination of the existence of an impact of the tennis ball with the surface of at least part of the tennis court.

8. The method as claimed in claim 7, wherein the step of analysing the image data to determine at least one parameter includes determination of the location of the contact or impact of the tennis ball with the surface of at least part of the tennis court in relation to tennis court line markings delineating legitimate zones of play.

9. The method as claimed in claim 1, wherein the activity comprises a cricket game, the target area comprises at least part of a cricket pitch where a batsman is stationed and wherein the contact causing localised infra red emission comprises contact involving a cricket ball, the contact also involving at least one of the following objects within the target area: a cricket bat, apparel being worn by the batsman, accessories being worn by the batsman including protective pads, gloves and helmet, and parts of the body of the batsman; and wherein the step of analysing the image data to determine at least one parameter of the contact of the cricket ball comprises at least determination of the existence of contact of the cricket ball with at least one of the objects.

10. The method as claimed in claim 1, wherein the activity comprises a game which involves a player who uses an implement to strike a projectile, wherein the target area comprises at least an area where the player is stationed when using the implement to strike the projectile, and wherein the contact causing localised infra red emission comprises a contact of the implement with the projectile, and wherein the step of analysing the image data to determine at least one parameter of the contact comprises at least determination of the location on the implement where contact with the projectile occurs.

* * * * *

UNITED STATES PATENT AND TRADEMARK OFFICE
CERTIFICATE OF CORRECTION

| | | |
|---|---|---|
| PATENT NO. | : 8,348,276 B2 | |
| APPLICATION NO. | : 12/281202 | |
| DATED | : January 8, 2013 | |
| INVENTOR(S) | : Brennan | |

It is certified that error appears in the above-identified patent and that said Letters Patent is hereby corrected as shown below:

In the Specification:

In Col. 1, line 50, delete "tie" and insert --the--.

In Col. 2, line 40, delete "wound" and insert --around--.

In Col. 3, line 58, delete "fames" and insert --frames--.

In Col. 4, line 24, delete "tee" and insert --the--.

In Col. 4, line 34, delete "tee" and insert --the--.

In Col. 5, line 56, delete "tames" and insert --frames--.

In Col. 6, line 64, delete "tie" and insert --the--.

In Col. 7, line 55, delete "tie" and insert --the--.

In Col. 8, line 62, delete "pan" and insert --part--.

In Col. 9, line 38, delete "tire" and insert --the--.

In Col. 9, line 62, delete "fractions" and insert --functions--.

In Col. 10, line 26, delete "mage" and insert --image--.

In Col. 11, line 47, delete "shed" and insert --scuffed--.

In Col. 11, line 62, delete "deter" and insert --determining--.

In Col. 12, line 11, delete "cared" and insert --carried--.

In Col. 14, line 38, delete "tie" and insert --the--.

Signed and Sealed this
Seventeenth Day of June, 2014

Michelle K. Lee
*Deputy Director of the United States Patent and Trademark Office*